(12) United States Patent
Maniyar (10) Patent No.: US 10,564,695 B2
(45) Date of Patent: Feb. 18, 2020

(54) ELECTRONIC DEVICE BATTERY MONITORING FOR TRANSACTIONS

(71) Applicant: PayPal, Inc., San Jose, CA (US)

(72) Inventor: Vidit Maniyar, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 72 days.

(21) Appl. No.: 15/791,321

(22) Filed: Oct. 23, 2017

(65) Prior Publication Data

US 2019/0121416 A1    Apr. 25, 2019

(51) Int. Cl.
*G06F 1/3212*        (2019.01)
*G06Q 20/32*         (2012.01)

(52) U.S. Cl.
CPC ......... *G06F 1/3212* (2013.01); *G06Q 20/322* (2013.01)

(58) Field of Classification Search
CPC .... G06Q 20/322; G06Q 20/123; G06Q 20/16; G06Q 20/401; G06F 3/0488; G06F 11/3058; G06F 1/3212; G06F 9/4418; G06F 9/5094; H04L 12/146; H04W 12/06
See application file for complete search history.

(56) References Cited

U.S. PATENT DOCUMENTS

| | | | |
|---|---|---|---|
| 2007/0287438 A1* | 12/2007 | Hansen | H04M 3/54 455/417 |
| 2013/0018792 A1* | 1/2013 | Casey | G06Q 40/02 705/44 |
| 2014/0040120 A1* | 2/2014 | Cho | G06Q 20/3278 705/39 |
| 2016/0189131 A1* | 6/2016 | Williams | H04W 52/0261 705/39 |
| 2017/0004483 A1* | 1/2017 | Runyan | G06Q 20/325 |

* cited by examiner

*Primary Examiner* — Terrell S Johnson (74) *Attorney, Agent, or Firm* — Haynes and Boone LLP (57) ABSTRACT

Methods and systems for transaction utilizing electronic device battery monitoring are disclosed herein. An electronic device may include a battery with a power level sensor. The power level may be monitored and, if the power level is below a threshold level, power draw of the electronic device may be reduced by shutting off one or more non-essential or low priority applications. Other transaction saving techniques may also be disclosed such as communicating data to the transaction server to allow for the transaction to be easily continued and/or indicating that the transaction should be automatically processed.

20 Claims, 6 Drawing Sheets

ELECTRONIC DEVICE BATTERY MONITORING FOR TRANSACTIONS

BACKGROUND

Field of the Invention

The present invention generally relates to electronic devices, and more particularly to battery monitoring and operation of such electronic devices under low battery conditions.

Related Art

Increasingly, electronic devices may be used to conduct electronic transactions. However, electronic devices have finite battery life. Conventional electronic devices may run out of battery while conducting transactions, leading to loss of data and failed transactions. Such loss may lead to inconvenience (e.g., being unable to ride share), loss of business, and/or failure to purchase a desired item (e.g., an item with limited stock). This problem has become increasingly important as electronic computing devices, such as smart phones, are providing more and more functionality requiring higher processing power, resulting in greater battery usage.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that allow electronic devices to prioritize and complete electronic transactions during low battery situations. The electronic devices described herein may include a battery that includes a power sensor configured to detect a power level of the battery, a non-transitory memory, and one or more hardware processors coupled to the non-transitory memory and the battery and configured to read machine-executable instructions from the non-transitory memory. The instructions may cause the system to perform operations that include receiving power data from the power sensor, determining, from the power data, that the power level of the battery is below a threshold power level, determining that the one or more hardware processors are running a plurality of applications including an in-progress transaction and a non-priority application, reducing a power draw of the non-priority application, and processing the in-progress transaction (e.g., transactions such as, but not limited to, purchase of goods, order of service, auction, and/or other such transactions).

Handheld and portable electronic devices are increasingly used to perform transactions. Such devices often have limited battery life, but users are often not in areas or situations where charging such devices is convenient. Unfortunately, users may still need to conduct transactions while their electronic devices have low battery life. An electronic device running out of battery during a transaction can be at least an annoyance, and may be critically problematic in the instance of important transactions that may, for example, lead to loss of business, loss of ability to purchase an item, leave a user stranded, or worse. Accordingly, systems and techniques described herein may allow for operation of the electronic devices to be optimized to conduct transactions in low battery situations, transaction data to be saved when electronic devices are out of battery power, or important transactions to be performed automatically in response to an out of power electronic device. Accordingly, convenience may be increased to users, critical transactions may still be conducted, and disruption to users may be minimized.

Figure 1:
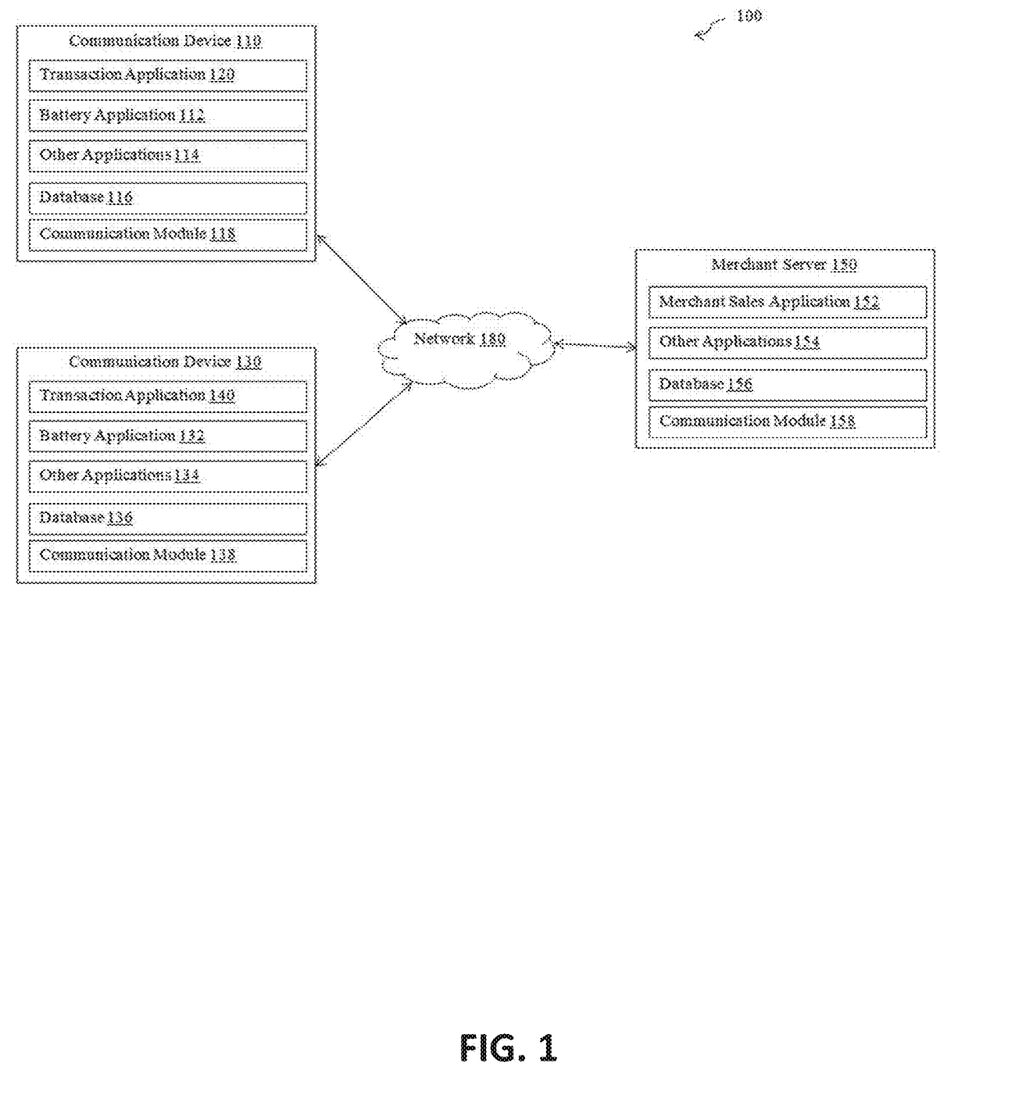
FIG. 1 is a block diagram showing a system according to an embodiment of the disclosure.

FIG. 1 is a block diagram showing a system according to an embodiment of the disclosure. As shown, system 100 may include or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, iOS®, Android®, or other suitable device and/or server or mobile based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 an electronic device 110, an electronic device 130, and a merchant server 150 in communication over a network 180. A user may utilize electronic device 110/130 to, for example, conduct one or more transactions. In this regard, transaction data may be communicated between electronic device 110/130 and merchant server 150 over network 180 to conduct one or more transactions. Both electronic devices 110 and 130 may be associated with a user or a transaction account.

Electronic device 110, electronic device 130, and merchant server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 180.

Electronic device 110/130 may be implemented as an electronic device that may utilize appropriate hardware and software configured for wired and/or wireless communication with electronic device 110/130 and/or merchant server 150. For example, in one embodiment, electronic device 110/130 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable electronic devices, and/or other types of computing devices capable of transmitting and/or receiving data, such as an IPAD® from APPLE®. The electronic device may be managed or controlled by any suitable processing device internal or external to the electronic device.

Electronic device 110/130 of FIG. 1 may each include a transaction application 120/140, a battery application 112/132, other applications 114/134, a database 116/136, and a communication module 118/138. Transaction application 120/140, battery application 112/132, and other applications 114/134 may correspond to executable processes, procedures, and/or applications with associated hardware. In other embodiments, electronic device 110/130 may include additional or different modules having specialized hardware and/or software as required.

Transaction application 120/140 may correspond to one or more processes to execute software modules and associated devices of electronic device 110/130 to conduct one or more transaction associated with the user. In certain embodiments, transaction application 120/140 may allow for a user to conduct one or more transactions using the application. Such an application may be, for example, a dedicated purchasing application linked with a transaction service (e.g., eBay® or other such services) or a merchant (e.g., Nordstrom® or other such merchants) or a payment application (e.g., PayPal® or other such application). The transaction application 120/140 may also be a plurality of separate applications linked together. Thus, for example, the transaction application 120/140 may be a combination of a purchasing application and a payment application. In various embodiments, transaction applications 120/140 may also include financial applications, such as banking, online payments, money transfer, or other applications.

In certain situations, a user may have multiple electronic devices, such as electronic devices 110 and 130. In such a situation, the transaction applications 120 and 140 may be linked so that the user can use either electronic device 110 or 130 to conduct a transaction using one electronic device and may continue the transaction from the other electronic device.

Battery application 112/132 may correspond to specialized hardware and/or software utilized by a user of electronic device 110/130 that may be used to determine a power level of a battery or batteries of electronic device 110/130. Thus, battery application 112/132 may include a power sensor. Such a power sensor may be internal hardware of the battery that can determine a power level of the battery and/or may be software configured to determine a power level of the battery.

Battery application 112/132 may communicate with transaction application 120/140, other applications 114/118, and/or other applications or controllers of electronic device 110/130. Thus, battery application 112/132 may interact with such applications and, for example, when a low battery level is determined, shut off or run in a low power mode for one or more applications.

One or more of the aforementioned features and/or processes of battery application 112/132 may be included within transaction application 120/140 or vice versa. For example, transaction application 120/140 may include battery monitoring functions. Thus, if such a transaction application 120/140 determines that battery levels are low, it may communicate with other applications and close such applications or place them in a low power mode, if proper permission is given to transaction application 120/140.

In various embodiments, electronic device 110/130 includes other applications 114/134 as may be desired in particular embodiments to provide features to electronic device 110/130. For example, other applications 114/134 may include security applications for implementing client-side security features, programmatic client applications for interfacing with appropriate application programming interfaces (APIs) over network 180, or other types of applications. Other applications 114/134 may also include email, texting, voice and IM applications that allow a user to send and receive emails, calls, texts, and other notifications through network 180. Other applications 114/134 may also include other location detection applications, which may be used to determine a location for the user, such as a mapping, compass, and/or GPS application, which can include a specialized GPS receiver that obtains location information for electronic device 110/130 and processes the location information to determine a location of electronic device 110/130 and the user. Other applications may include social networking applications, media viewing, and/or merchant applications.

Other applications 114/134 may also be associated with other devices, such as biometric devices and other types of accessible or connected devices. Other applications 114/134 may be utilized by other applications 114/134 to determine user data or other information, which may be communicated to service provider server 160. For example, other applications 114/134 may be associated with a secondary device, such as a FITBIT®. Thus, other applications 114/134 may collect, capture, and/or otherwise determine user data and other information for the user, which may be used to determine interests and knowledge in interests. The user's information may correspond to locations of the user, which may further be determined using a location determination system, such as a GPS module of electronic device 110/130 and associated systems, calendaring/scheduling information, biometrics, etc. Other applications 114/134 may include device interfaces and other display modules that may receive input from the user and/or output information to the user. For example, other applications 114/134 may contain software programs, executable by a processor, including a graphical user interface (GUI) configured to provide an interface to the user. Other application 114/134 may therefore use devices of electronic device 110/130, such as display devices, including GUIs capable of displaying information to users and other output devices, including speakers. Electronic device 110/130 may include input devices, including touch screens. Electronic device 110/130 may include a sensor or other component used to collect the current information associated with the user, such as an input device, a camera, a microphone, an accelerometer, a motion detector, an environmental sensor, and/or a biometric sensor.

Electronic device 110/130 may further include database 116/136 stored to a transitory and/or non-transitory memory of electronic device 110/130, which may store various applications and data and be utilized during execution of various modules of electronic device 110/130. Thus, database 116/136 may include, for example, identifiers such as operating system registry entries, cookies associated with battery application 112/132 and/or other applications 114/134, identifiers associated with hardware of electronic device 110/130, or other appropriate identifiers, such as identifiers used for payment/user/device authentication or identification, which may be communicated as identifying electronic device 110/130 to service provider server 160. Database 116/136 may include current and/or historical transaction information. Additionally, database 116/136 may store account information and/or account preferences for an account with service provider server 160. Where applicable, information used by transaction application 120/140 may be stored to database 116/136 (e.g., log-in information, payment information, preferred shopping categories etc.).

Electronic device 110/130 includes at least one communication module 118/138 adapted to communicate with electronic device 110/130 and merchant server 150. In various embodiments, communication module 118/138 may include a DSL (e.g., Digital Subscriber Line) modem, a PSTN (Public Switched Telephone Network) modem, an Ethernet device, a broadband device, a satellite device and/or various other types of wired and/or wireless network electronic devices including microwave, radio frequency, infrared, Bluetooth, and near field electronic devices. Communication module 118/138 may communicate directly with nearby devices using short range communications, such as Bluetooth Low Energy, LTE Direct, WiFi, radio frequency, infrared, Bluetooth, and near field communications.

Merchant server 150 may be implemented using any appropriate hardware and software configured for wired and/or wireless communication with electronic device 110/130. Merchant server 150 may correspond to a device, server, or cloud computing architecture to provide sales of items, for example, through an online marketplace accessible over a network connection with merchant server 150. Merchant server 150 may further be used to process payments for items and provide incentives for purchase of items and/or advertisement of items to other users. Although a merchant server is shown, the merchant server may be managed or controlled by any suitable processing device. Although only one merchant server is shown, a plurality of merchant servers may function similarly.

Merchant server 150 of FIG. 1 contains a merchant sales application 152, other applications 164, a database 166, and a communication module 158. Merchant sales application 152 and other applications 164 may correspond to processes, procedures, and/or applications executable by a hardware processor, for example, a software program. In other embodiments, merchant server 150 may include additional or different modules having specialized hardware and/or software as required.

Merchant sales application 152 may correspond to one or more processes to execute modules and associated specialized hardware of merchant server 150 that provide a marketplace to sell one or more items offered by a merchant (not shown) associated with merchant server 150, and further provider checkout and payment processes for a transaction to purchase the items for sale from the merchant corresponding to merchant server 150. In this regard, merchant sales application 152 may correspond to specialized hardware and/or software of merchant server 150 to provide a convenient interface to permit a merchant offer items for sale. For example, merchant sales application 152 may be implemented as an application offering items for sale that may be accessed by electronic device 110 to present the items for sale to the user associated with electronic device 110. In certain embodiments, merchant sales application 152 may correspond to a website available over the Internet and/or online content and/or database information accessible through a dedicated application. Thus, merchant sales application 152 may provide item sales through an online marketplace using the website of the merchant.

Merchant sales application 152 may include information for a price for the item, a discount for the item, a price change for the item, and/or other incentives for items and/or with the merchant corresponding to merchant server 150 (e.g., rebates, payments, etc.). As described here, "item" may prefer to physical items (e.g., tangible goods), services, instruments such as financial transactions (e.g., purchase of options), and/or any other tangible good, intangible good, or service that may be purchased, rented, or otherwise paid for. Merchant sales application 152 may be used to establish a transaction once the user associated with electronic device 110/130 has selected one or more items for purchase. Once a payment amount is determined for the transaction for the item(s) to be purchased, merchant sales application 152 may request payment from the user. Merchant sales application 152 may receive payment processing information, such as a payment and a receipt. In such embodiments, the payment request may be processed, payment provided to the merchant account, and notification of payment (or failure, for example, where there are insufficient user funds) may be sent to merchant sales application 152. The payment may be made by payment provider (e.g., credit card company, online payment provider, autonomous payment provider, and/or other such entity) on behalf of the user associated with electronic device 110/130. Merchant sales application 152 may then receive the results of the transaction processing, and complete the transaction with the user, for example, by providing the user the items for the transaction or declining the transaction where the user is not authenticated or the transaction is not authorized (e.g., insufficient funds).

In certain embodiments, merchant sales application 152 may receive battery information from electronic device 110/130 (e.g., from battery application 112/132). In response to the battery information, the merchant sales application 152 may determine that electronic device 110/130 may soon run out of battery, as discussed in more detail below, and save transaction information, automatically process the transaction, provide one or more recovery techniques for the user to recover the transaction, or allow another electronic device to take over the transaction. In certain embodiments, the level of battery life may be determined by merchant sales application 152, by electronic device 110/130 (e.g., by the OS of electronic device 110/130), and/or by one or more other components, devices, or applications described herein.

Merchant server 150 includes other applications 164 as may be desired in particular embodiments to provide features to merchant server 150. For example, other applications 164 may include security applications for implementing server-side security features, programmatic client applications for interfacing with appropriate application programming interfaces (APIs) over network 150, or other types of applications. Other applications 164 may also include email, texting, voice and IM applications that allow a user to send and receive emails, calls, texts, and other notifications through network 150. In various embodiments, other applications 164 may include financial applications, such as banking, online payments, money transfer, or other applications to allow processing of transaction with the user. Other applications 164 may contain software programs, executable by a processor, including a graphical user interface (GUI) configured to provide an interface to the user.

Merchant server 150 may further include database 156 which may include, for example, identifiers such as operating system registry entries, cookies associated with merchant sales application 152 and/or other applications 154, identifiers associated with hardware of merchant server 150, or other appropriate identifiers, such as identifiers used for payment/user/device authentication or identification. Identifiers in database 156 may be used by a payment/credit provider to associate merchant server 150 with a particular account maintained by the payment/credit provider. Item, sales, and/or benefit information for items sold by the merchant associated with merchant server 150 may be stored to database 156. Database 156 may further include transaction information and/or results, including transaction histories.

Merchant server 150 includes at least one communication module 158 adapted to communicate with electronic device 110/130. In various embodiments, communication module 158 may include a DSL (e.g., Digital Subscriber Line) modem, a PSTN (Public Switched Telephone Network) modem, an Ethernet device, a broadband device, a satellite device and/or various other types of wired and/or wireless network electronic devices including microwave, radio frequency, infrared, Bluetooth, and near field electronic devices.

Network 180 may be implemented as a single network or a combination of multiple networks. For example, in various embodiments, network 180 may include the Internet or one or more intranets, landline networks, wireless networks, and/or other appropriate types of networks. Thus, network 180 may correspond to small scale communication networks, such as a private or local area network, or a larger scale network, such as a wide area network or the Internet, accessible by the various components of system 100.

Figure 2:
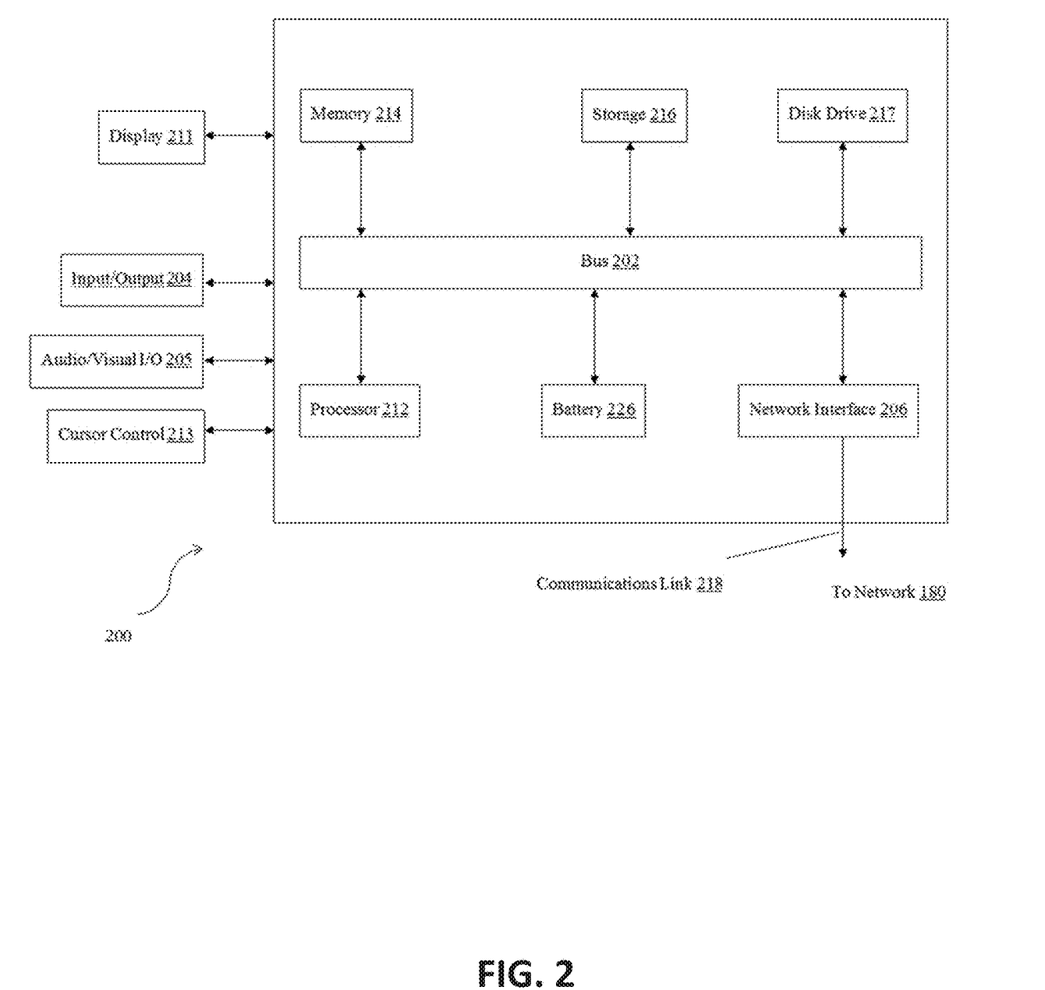
FIG. 2 is a block diagram showing an electronic device according to an embodiment of the disclosure.

FIG. 2 is a block diagram showing an electronic device according to an embodiment of the disclosure. In various embodiments, the electronic device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 200 in a manner as follows.

Computer system 200 includes a bus 202 or other communication mechanism for communicating information data, signals, and information between various components of computer system 200. Components include an input/output (I/O) component 204 that processes a user action, such as selecting keys from a virtual or physical keypad/keyboard, selecting one or more buttons, image, or links, and/or moving one or more images, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another electronic device, service device, or a merchant server via network 180. In one embodiment, the transmission is wireless, although other transmission mediums and methods may also be suitable. One or more processors 212, which can be a micro-controller, digital signal processor (DSP), or other processing component, processes these various signals, such as for display on computer system 200 or transmission to other devices via a communication link 218. Processor(s) 212 may also control transmission of information, such as cookies or IP addresses, to other devices.

Components of computer system 200 also include a system memory component 214 (e.g., RAM), a static storage component 216 (e.g., ROM), a disk drive 217, and/or a battery 226. Computer system 200 performs specific operations by processor(s) 212 and other components by executing one or more sequences of instructions contained in system memory component 214. Logic may be encoded in a computer readable medium, which may refer to any medium that participates in providing instructions to processor(s) 212 for execution. Such a medium may take many forms, including but not limited to, non-volatile media, volatile media, and transmission media. In various embodiments, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory computer readable medium. In one example, transmission media may take the form of acoustic or light waves, such as those generated during radio wave, optical, and infrared data communications.

In certain examples, battery 226 may include or be coupled to a power sensor configured to detect a power level of battery 226. The power sensor can output data indicating the power level to processor 212. Processor 212 may be configured to adjust operation of processor 212 in response to the power level (e.g., one or more non-essential or non-transaction programs may be paused). In certain embodiments, processor 212 may also include software that determines an importance of the transaction as well as estimates an amount of time that the electronic device will remain operational and an amount of time required to conduct the transaction. The programs may only be paused if the estimated amount of time required to conduct the transaction is greater than the estimated amount of time that the electronic device will remain operational (e.g., without pausing programs) and so the electronic device is required to save battery life to complete the transaction. In embodiments, the processor 212 may also be configured to determine that a transaction will not be completed before battery 226 is out of charge. In such a situation, processor 212 may transmit information to merchant server 150 indicating that the transaction data should be saved and/or that the transaction should be automatically completed. Such information transmitted to merchant server 150 may, additionally or alternatively, include an indication that battery 226 will run out of charge before completion of the transaction.

Figure 3:
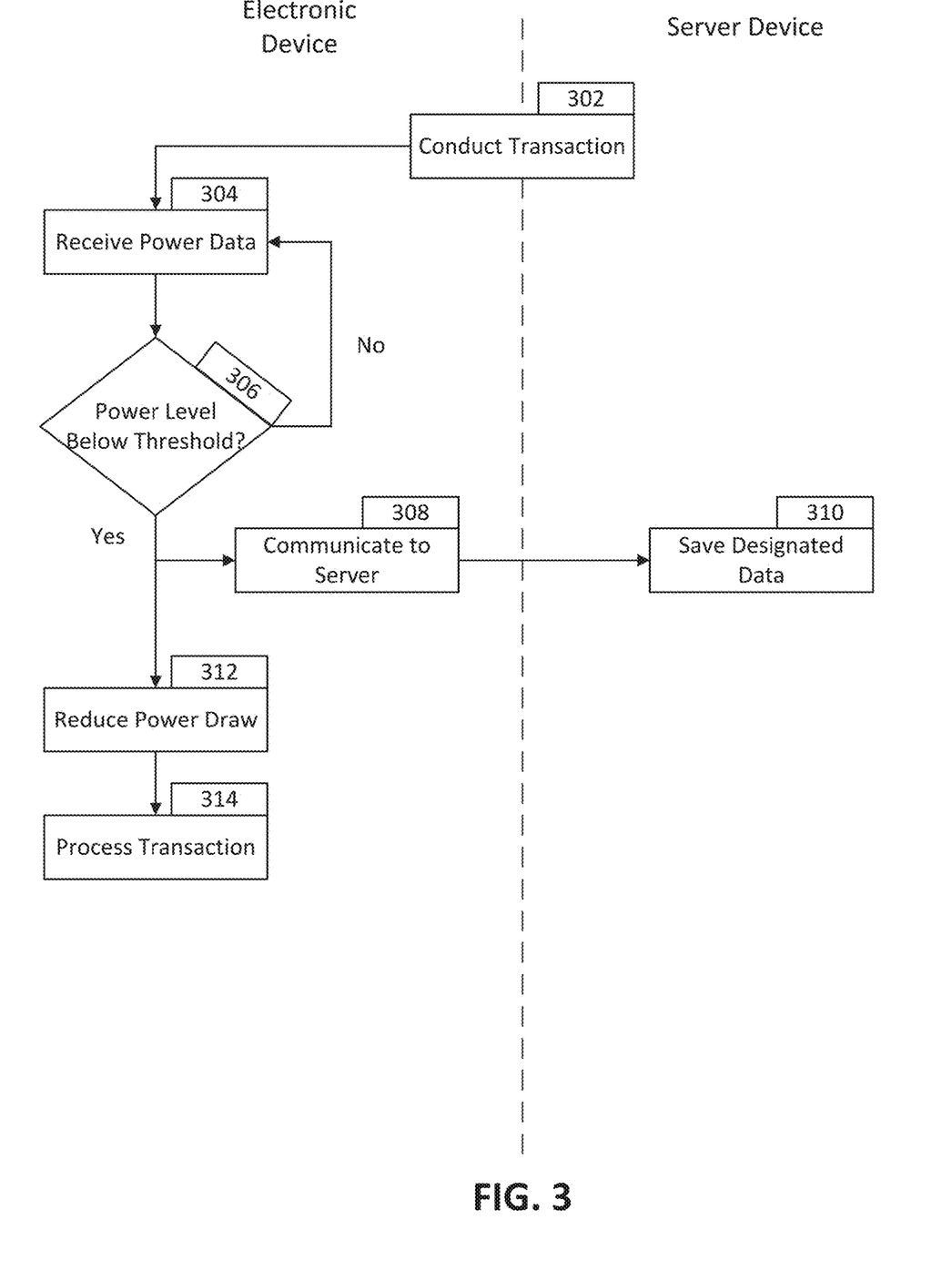
FIG. 3 is a flowchart showing an electronic transaction with battery monitoring according to an embodiment of the disclosure.
Figure 4:
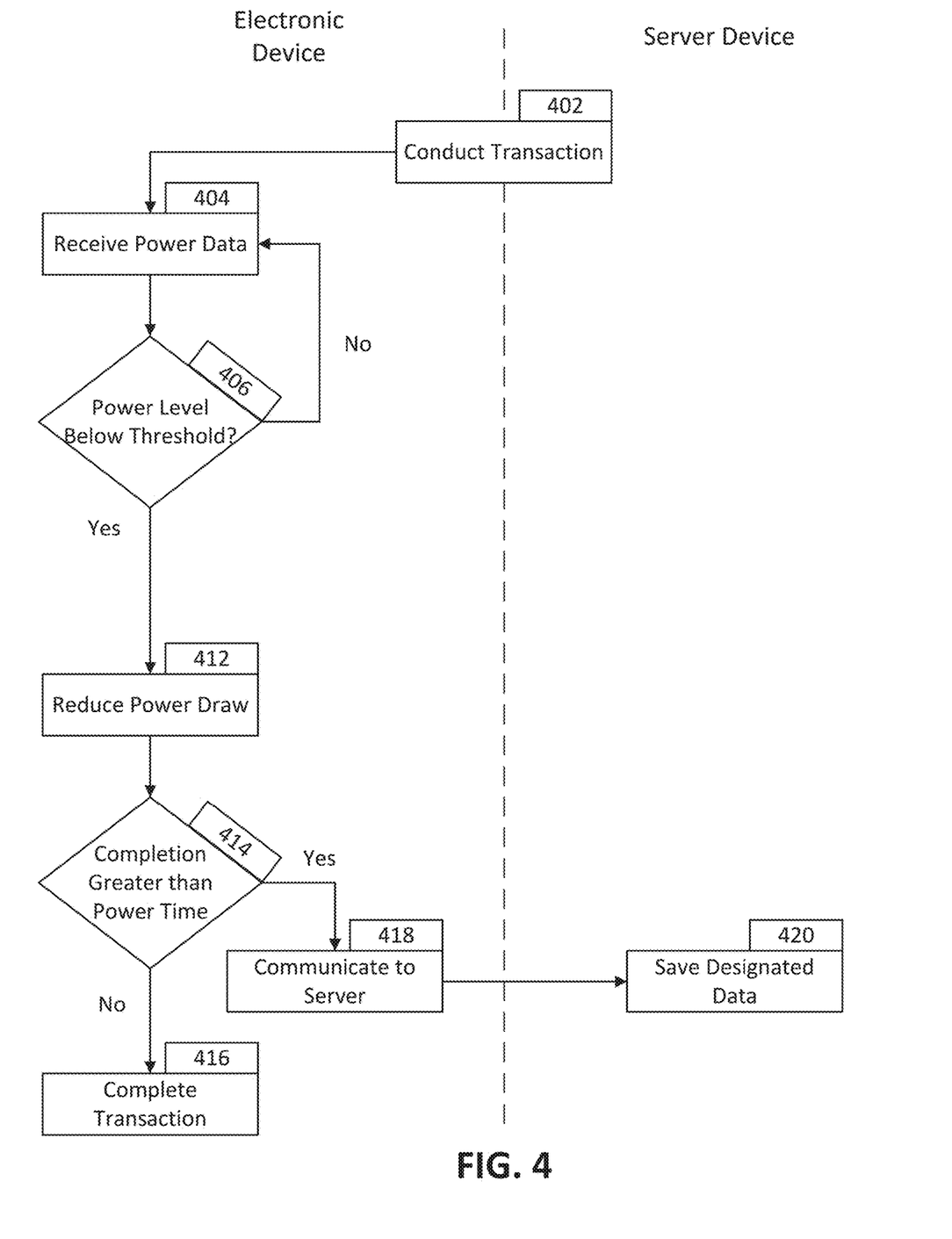
FIG. 4 is a flowchart showing another electronic transaction with battery monitoring according to an embodiment of the disclosure.
Figure 5:
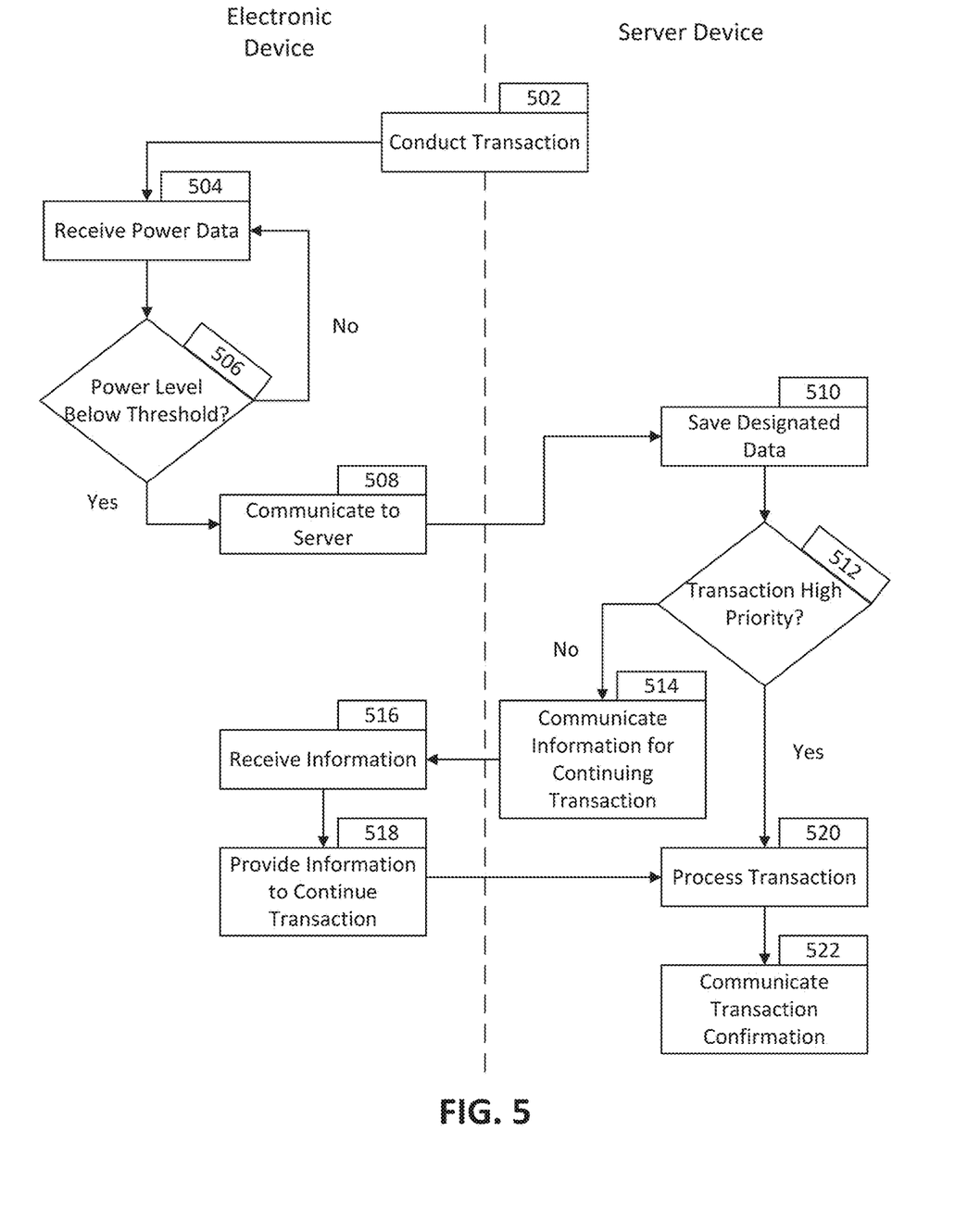
FIG. 5 is a flowchart showing a further electronic transaction with battery monitoring according to an embodiment of the disclosure.

FIG. 3 is a flowchart showing an electronic transaction with battery monitoring according to an embodiment of the disclosure. FIGS. 3-5 are flowcharts detailing electronic transactions that are conducted between a electronic device and a server device. As such, FIGS. 3-5 are broken down into electronic device sections and server device sections to better illustrate which devices perform which aspects.

In step 302 of FIG. 3, a transaction is conducted between the electronic device and the server device. The transaction may be an electronic transaction between the electronic device and the server device. Such a transaction may be a traditional merchant transaction (e.g., purchase of goods such as concert tickets, merchandise, or other items) or may be a continuous transaction (e.g., request for a ride share where the transaction may require the electronic device to continue operating to meet the driver). In certain embodiments, the processor may first determine that a transaction is in progress in step 302 before performing the techniques described herein. If no transaction is being performed, the processor may not reduce power draw of the electronic device. However, if the system determines that the power level is below a certain threshold, and the user will likely utilize the electronic device to conduct a transaction, the process may reduce power as detailed below. For example, based on various data sources, such as a user calendar (e.g., needing a trip to the airport or other location), past transactions (e.g., regular coffee or other item/service purchases), social networks, the system may determine an upcoming transaction will need to be processed using the electronic device. In certain embodiments, such a determination may be made at the start of the transaction, when the power level is determined to be below the threshold, due to user input, at a time during the transaction, or at another time.

The transaction may be determined according to an importance rating and the techniques described herein may only be performed if the transactions are determined to have an importance rating greater than a threshold rating. For example, a ride sharing request or a purchase of a concert ticket that may sell out quickly may receive a higher importance rating than a purchase of an item from an online merchant that continuously restocks inventory. As such, the ride sharing request and the concert ticket purchase may have a higher importance rating and thus the techniques described herein may be employed for such transactions. The purchase for easily restocked inventory may not need the techniques described herein and thus not be employed. Information may be transferred between the electronic device to the server device or prepared to be transferred in anticipation of the transaction in step 302.

In step 304, a power sensor of the battery may detect the power level of the battery. The power sensor may be an internal hardware sensor that may be integrated with the battery, an external hardware sensor coupled to the battery, a software sensor within a processor of the electronic device that may be a part of firmware (e.g., operating system) and/or software (e.g., one or more applications) of the electronic device. The power level may be determined and/or received by the transaction application of the electronic device in step 304. In certain embodiments, the transaction application may receive or have been granted permission to determine or receive a power level of the battery and/or may receive or have been granted permission to perform one or more operations in response to determining or receiving the power level of the battery.

In step 306, after receiving or determining the power level, the power level is compared to a threshold. If the power level is above the threshold, the technique returns to step 304 and monitoring of the power level of the electronic device continues. If the power level is below the threshold, the technique may continue to steps 308 and/or 312.

In certain embodiments, the threshold may be a specific power level (e.g., 5% battery life, 10% battery life, 15% battery life, 20% battery life, and/or other such level). The power level is compared to the threshold in step 306. In other embodiments, steps 304 and 306 may be combined and, for example, the power level of the battery may only be received by the application (e.g., transaction application) if the power level is below the threshold. In such an embodiment, the additional application and/or firmware may monitor power level of the battery and provide information as needed (e.g. when the battery is below the threshold) to the transaction application. The threshold may be based on various factors, such as, but not limited to, expected battery power needed to complete a transaction that is ongoing or is expected to be initiated, power consumption rate of the battery (e.g., based on historical rates, where an older battery may use more power than a new one), expected time the device may be recharged, such as determining the user is going home or to an office based on GPS location information received from the device, and/or other functionality needed or desired of the device, such as GPS functionality if the user is in an unfamiliar area and is expected to need map functionality.

Various embodiments may, if the power level is determined to be below the threshold in step 306, accordingly perform one or both of steps 308 and 312. In step 312, power draw of the electronic device may be reduced to increase the time that electronic device can continue operating before running out of power. Reduction of power draw may include, for example, running one, some, or all non-essential applications or processes of the electronic device at a lower power rate, pausing such non-essential applications of the electronic device (e.g., until the user un-pauses or until the transaction has been completed), or shutting off the non-essential applications.

In certain embodiments, a required power draw savings may be determined. The required power draw savings may be the reduction in power draw needed to complete the transaction (and may include a safety margin). Operation of the electronic device may be altered in response to the required power draw savings by running at a lower power draw, pausing, and/or shutting off such applications in a manner to meet the required power draw savings.

Such non-essential applications may be provided or may be determined according to a priority rating. As such, for example, a map application may have a higher priority rating while a weather forecasting application or phone process (e.g., processes that always keep something on screen, a notification process, storage monitoring service, or other such process) may have a lower priority rating. Accordingly, the lower priority rating may be paused or shut off before the higher priority rating. In certain such embodiments, applications that have been used within a certain timeframe and/or is currently operating may have a higher priority rating, while applications that are operating in the background may have a lower priority rating. In other embodiments, applications that are incompatible with the transaction (e.g., applications that may have been used to search for the same item that is currently involved in the transaction) may also have a lower priority rating. Additionally, the user of the electronic device may also manually assign priority ratings to applications or categories of applications. The reduction in power draw may then follow such priority ratings. It is noted that the priority ratings of essential and non-essential applications, as well as whether an application is classified as essential or non-essential, may change based on the expected need of such applications.

The transaction may be processed in step 314. In certain embodiments, the transaction may be processed normally without any changes in battery power management, but other embodiments may process the transaction in a reduced power mode by, for example, decreasing the amount of battery life needed to process the transaction. For example, only information essential or required to processing the transaction may be processed and other information (e.g., confirmation screens and double checking steps) may be avoided to save battery life. In certain embodiments, if the electronic device later determines that is running out of battery, it may save the transaction data within a database of the electronic device so that the transaction can be more conveniently completed with a later device or at a later time.

Alternative or additional to step 312, the power level status of the electronic device and/or data associated with the transaction may be communicated to the server device in step 308. As such, a message indicating that the power level of the electronic device is lower than the threshold may be communicated to the server device. Additionally or alternatively, relevant transaction data may also be communicated. Such transaction data may include information identifying the user's account, the item in question, the payment method, delivery instructions, billing information, information for processing the transaction (e.g., process immediately, process automatically, or hold pending confirmation) and/or other such information. Such information may be manually provided by the user or may be automatically generated.

Upon receiving the power level status of the electronic device and/or data associated with the transaction, the server device may save designated data in step 310. Designated data may include, for example, information relevant or needed to conducting the transaction. The server device may save the designated data within a dedicated database and/or may flag the data as related to a transaction that includes data required to be saved. Saving the designated data may allow for the user to continue the transaction at a later time when the electronic device has electrical power or may allow the user to continue the transaction from an additional device.

A message or code may be transmitted to the electronic device and/or another device associated with the customer. The customer may then access the designated data via the message or code (e.g., by clicking a hyperlink within the message and/or entering the code within the transaction application). The transaction may then accordingly be continued at a later time period.

FIG. 4 is a flowchart showing another electronic transaction with battery monitoring according to an embodiment of the disclosure. FIG. 4 describes a variation of the technique of FIG. 3 that only communicates the designated data if the electronic device determines that the transaction cannot be completed before the electronic device is without power.

Steps 402, 404, 406, and 412 are similar to steps 302, 304, 306, and 312 of FIG. 3. In step 414, a completion time of the transaction may be estimated, an estimated amount of time that the electronic device may be operational may also be determined, and the two times may be compared.

The completion time of the transaction may be estimated based on a database of historical transaction times and such a database may be stored on a database of the electronic device to avoid requiring accessing other databases over a network and thus may minimize power consumption. Such a database may include historical times of user (e.g., the time that the user historically requires to complete the transaction, stored as an accessible document within the database), aggregate historical times (e.g., of an entire user base and such historical times may be regularly updated when there is a sufficient battery level), or may be a pre-determined estimate (e.g., programmed into the transaction application). The estimated amount of time that the electronic device may be operational may be determined according to a power draw per unit time of the electronic device versus the amount of battery level. Such a power draw may be a power draw determined before and/or after the power draw of the electronic device has been reduced.

If, in step 414, the processor of the electronic device determines that the transaction may not be completed before the electronic device is out of power, designated data may be communicated to the server device. The designated data may be stored by the server device in step 420 and/or may be used to allow the server device to automatically conduct the transaction.

If, in step 414, the processor of the electronic device determines that the transaction may be completed before the electronic device is out of power, the transaction may be processed by the electronic device in step 416. In such a situation, the electronic device may continue to determine a remaining time of operation and, if it then later determines that the remaining time of operation of the electronic device is less than an updated time needed to complete the transaction, the electronic device may then communicate the designated data to the server device.

FIG. 5 is a flowchart showing a further electronic transaction with battery monitoring according to an embodiment of the disclosure. FIG. 5 describes a variation of the technique of FIGS. 3 and 4 that may automatically conduct the transaction depending on the importance of the transaction.

Steps 502, 504, 506, 508, and 510 are similar to steps 302, 304, 306, 308, and 310 of FIG. 3. In step 512 a transaction priority may be determined for the transaction. For example, the transaction may have an assigned priority rating. The priority rating may be assigned by the user (e.g., the user may designate certain transaction as important or may designate different categories of transactions with different priority ratings) and/or may be determined by the server device (e.g., the server may have pre-determined priority ratings for different types of transaction and/or may analyze the transaction by, for example, determining the importance or rarity of the transaction). Thus, the server device may automatically determine that a ride-sharing request is important as the rider may be left stranded. The server device may also determine that purchasing a rare item or bidding in an account for a rare item may be important as such an item may easily sell out. The process may then proceed to step 520.

By contrast, for transactions that are determined to not be as important (e.g., the transaction rating may be lower than a threshold), such as a purchase for normal household items or a purchase for goods where alternatives are easily available, the server device may determine that the priority rating of the transaction is not higher than the threshold. Accordingly, the process may proceed to step 514.

In certain embodiments, the importance may also be determined according to other factors. For example, the expected time the device may be recharged, such as determining the user is going home or to an office based on GPS location information received from the device, and/or other functionality needed or desired of the device, such as GPS functionality if the user is in an unfamiliar area and is expected to need map functionality may also be factors. In such an embodiment, for example, an auction that has 5 minutes remaining may be considered of higher importance than an auction that has 20 hours remaining. Alternatively, concrete tickets that are historically determined to sell out in a longer period of time may be considered less important as the user may still have an opportunity to recharge and purchase the ticket at a later date. In certain such embodiments, the server device may receive data from the electronic device indicating that the electronic device has run out of battery and commence monitoring the transaction. The server device may not conduct the transaction until, for example, the item may be about to sell out.

In step 514, information for the electronic device to continue the transaction may be communicated. Such information may include a Uniform Resource Locator ("URL"), a code, or other such information that allows a user to continue the transaction by, for example, accessing previously entered information or recall information used for the transaction. Such information may be communicated to the electronic device (e.g., the user may receive the information when the electronic device is once again powered) and/or may be communicated to another device associated with the user. In certain embodiments, such information may be a format so that, when the electronic device and/or other device is powered, the information is automatically preloaded within the relevant sections and such information may be the first screen that is presented to the user. The information may be received in step 516.

In certain embodiments, the transaction may be continued if the user provides relevant or needed/requested information. For example, the user may be required to log back into the account and/or provide the code received to repopulate the information. In such embodiments, the required information may be provided in step 518.

For situations where transaction information is saved and used to continue a transaction without loss of data, after the relevant information is provided, processing of the transaction may be continued in step 520. The user may then confirm information, provide any additional information, and confirm that the transaction should be processed. The transaction may then be completed.

Otherwise, in situations where the transaction is determined to be of a priority higher than the threshold priority, the transaction may be automatically processed in step 520. The transaction may be processed automatically through information already entered by the user and/or stored within a database of the server device of the merchant. In situations where a location of the user is required, such as for ride-sharing, the driver booked for ride-sharing may be automatically directed to the last known location of the user and notified that the user's electronic device is out of battery. Otherwise, for, e.g., physical items, the item may be automatically purchased or a bid up to a maximum bid may be automatically placed. The server device would thus direct the transaction when the electronic device is determined to be out of battery.

In step 522, a transaction confirmation may be provided. For embodiments where the transaction has been processed automatically, the transaction confirmation may also communicate an option for the user to cancel the transaction. Thus, if the user had not intended to fully process the transaction, the transaction may be canceled.

The techniques described herein may be performed in orders different from that described. Steps may be performed in different orders and certain steps may be omitted. Also, additional steps may also be added during performance of the techniques.

Figure 6:
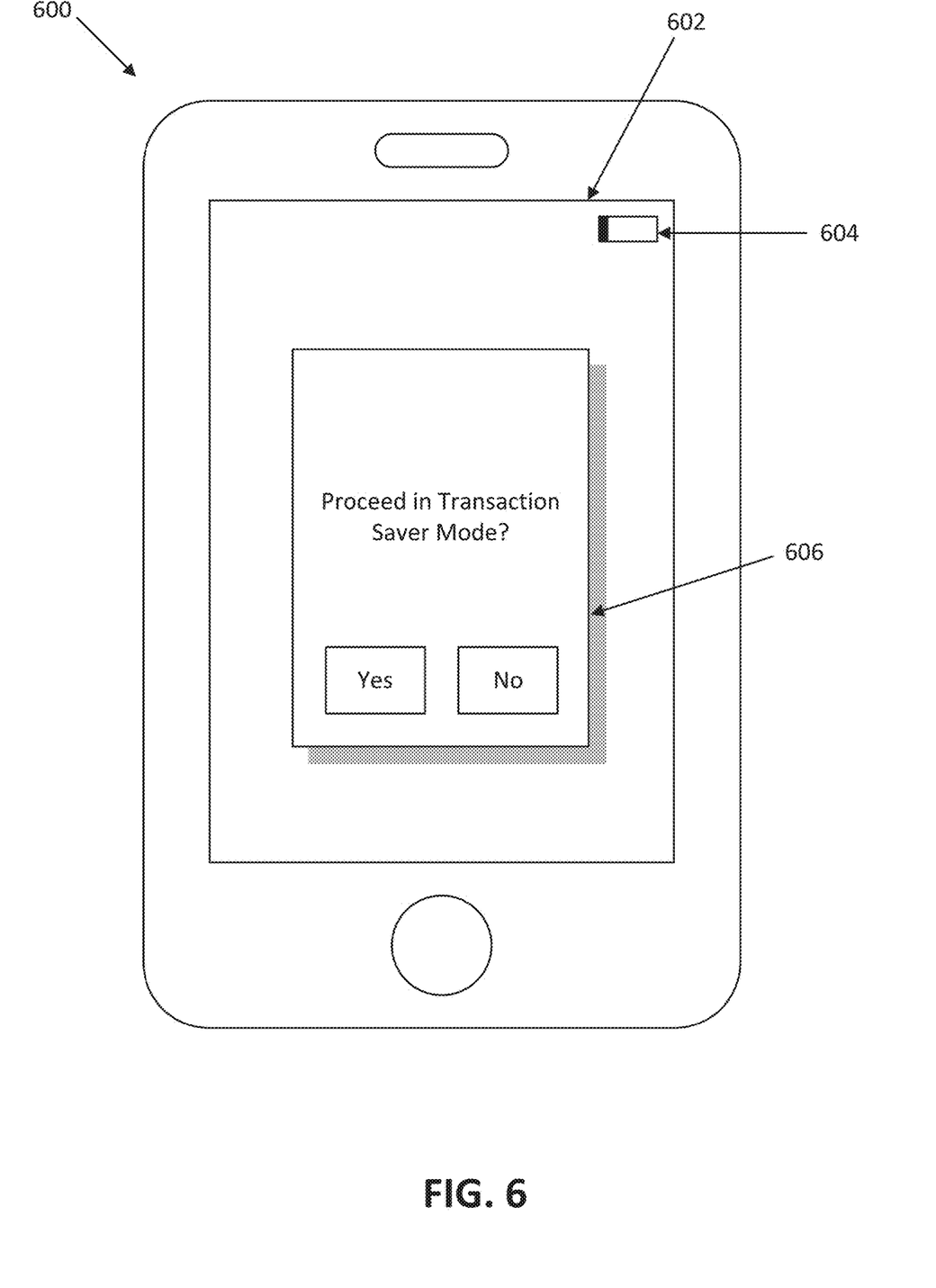
FIG. 6 shows a user interface according to an embodiment of the disclosure.

FIG. 6 shows a user interface according to an embodiment of the disclosure. Electronic device 600 includes a screen 602. As shown, battery life indicator 602 may indicate a battery level below a threshold battery level. As such, window 606 may provide a message to the user asking for confirmation to proceed in a Transaction Saver Mode. In the Transaction Saver Mode, power draw of the electronic device may be decreased by operating in a lower power mode, pausing, and/or shutting off non-essential or unimportant applications. Additionally, transaction information may be saved by the electronic device or a server device associated with the transaction and, in cases where power is about to run out, the server device may be instructed to automatically process the transaction.

Note that although the above description was focused on power saving and finishing a transaction when the battery level is below a threshold, same or similar functionality can be applied for completing or processing a transaction not yet started at the time battery power is being saved or otherwise managed as discussed above.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A mobile electronic device comprising:
a battery;
a power sensor configured to detect a power level of the battery;
a non-transitory memory; and
one or more hardware processors coupled to the non-transitory memory and the battery and configured to read machine-executable instructions from the non-transitory memory to cause the mobile electronic device to perform operations comprising:
receiving power data from the power sensor;
determining, from the power data, that the power level of the battery is below a threshold power level;
determining that the one or more hardware processors are running a plurality of applications including a first application conducting a digital transaction from the mobile electronic device and a second application;
determining, by the mobile electronic device based on the power data, that the power level of the battery is sufficient to complete electronic processing of the digital transaction through the first application on the mobile electronic device only if a current power draw of the second application is reduced;

reducing, by the mobile electronic device, the current power draw of the second application; and
maintaining power to the first application on the mobile electronic device.

2. The mobile electronic device of claim 1, wherein the determining that the power level of the battery is sufficient to complete the electronic processing comprises:
estimating, from the power data, a remaining time of operation of the mobile electronic device;
estimating a time to completion for the digital transaction; and
comparing the estimated remaining time of operation to the estimated time to completion.

3. The mobile electronic device of claim 1, wherein the maintaining comprises providing power at least until the digital transaction is completed.

4. The mobile electronic device of claim 1, wherein the operations further comprise saving designated data associated with the digital transaction.

5. The mobile electronic device of claim 4, wherein the saving is within the mobile electronic device.

6. The mobile electronic device of claim 1, wherein the operations further comprise communicating designated data associated with the digital transaction to a server device.

7. The mobile electronic device of claim 1, wherein the reducing comprises pausing or ceasing running the second application.

8. A method comprising:
initiating a digital transaction through a first application on a user device of a user, wherein the user device comprises a mobile device;
receiving, from the user device, a first indication that a power level of a battery of the user device is below a threshold power level;
determining, based on the first indication, that the power level of the battery is sufficient to complete electronic processing of the digital transaction through the first application on the user device only if a current power draw of at least one additional application is reduced;
reducing, by the user device, a power draw of the battery by the at least one additional application on the user device; and
saving designated data associated with the digital transaction within a database before the digital transaction is completed.

9. The method of claim 8, further comprising:
receiving a second indication that the user wishes to continue the digital transaction;
accessing the designated data from the database; and
communicating the designated data to another device associated with the user before the digital transaction is completed.

10. The method of claim 9, wherein the another device is a device designated by the user.

11. The method of claim 8, further comprising:
communicating a code associated with the designated data to another device associated with the user, wherein the code is configured to allow access to the designated data.

12. The method of claim 8, further comprising:
determining a priority level of the digital transaction.

13. The method of claim 12, further comprising:
determining that the priority level is higher than a threshold priority level; and
automatically processing the digital transaction with transaction data of the user stored within a transaction database in response to determining that the priority level is higher than the threshold priority level.

14. The method of claim 13, further comprising:
communicating a request for transaction confirmation to another device associated with the user.

15. A non-transitory machine-readable medium having stored thereon machine-readable instructions executable to cause a machine to perform operations comprising:
receiving power data from a power sensor of a battery of an electronic device, wherein the electronic device comprises a mobile electronic device;
determining, from the power data, that a power level of the battery is below a threshold power level;
determining that the electronic device is running a plurality of applications including a first application processing a digital transaction and a second application;
determining, based on the power data, that the power level of the battery is sufficient to complete electronic processing of the digital transaction through the first application on the electronic device only if a current power draw of the second application is reduced;
reducing, by the electronic device, the current power draw of the second application; and
maintaining power to the first application on the electronic device until at least the digital transaction is completed.

16. The non-transitory machine-readable medium of claim 15, wherein the determining that the power level of the battery is sufficient to complete the electronic processing comprises:
estimating, from the power data, a remaining time of operation of the electronic device;
estimating a time to completion for the digital transaction; and
comparing the estimated remaining time of operation to the estimated time to completion.

17. The non-transitory machine-readable medium of claim 15, wherein the maintaining comprises providing power at least until the digital transaction is completed.

18. The non-transitory machine-readable medium of claim 15, wherein the operations further comprise saving designated data of the digital transaction before the digital transaction is completed.

19. The non-transitory machine-readable medium of claim 18, wherein the saving is within a database of the electronic device or the operations further comprise communicating the designated data to a server device.

20. The non-transitory machine-readable medium of claim 15, wherein the reducing comprises pausing or ceasing running the second application.

* * * * *